United States Patent
Gumaste et al.

(10) Patent No.: US 9,742,518 B2
(45) Date of Patent: *Aug. 22, 2017

(54) FLEXIBLE INTERCONNECTION OF SCALABLE SYSTEMS INTEGRATED USING OPTICAL NETWORKS FOR DATACENTERS

(71) Applicant: Indian Institute of Technology Bombay, Mumbai (IN)

(72) Inventors: Ashwin Gumaste, Mumbai (IN); Bala Murali Krishna Bheri, Mumbai (IN)

(73) Assignee: Indian Institute of Technology Bombay, Mumbai (IN)

(*) Notice: Subject to any disclaimer, the term of this patent is extended or adjusted under 35 U.S.C. 154(b) by 229 days.

This patent is subject to a terminal disclaimer.

(21) Appl. No.: 14/043,844

(22) Filed: Oct. 1, 2013

(65) Prior Publication Data
US 2014/0363160 A1   Dec. 11, 2014

(30) Foreign Application Priority Data

Jun. 10, 2013 (IN) .......................... 1980/MUM/2013

(51) Int. Cl.
*H04J 14/02* (2006.01)
*H04B 10/275* (2013.01)
*H04L 12/753* (2013.01)

(52) U.S. Cl.
CPC ........ *H04J 14/0212* (2013.01); *H04J 14/029* (2013.01); *H04J 14/0213* (2013.01);
(Continued)

(58) Field of Classification Search
CPC ............... H04J 14/0212; H04J 14/0213; H04J 14/0269; H04J 14/029; H04J 14/0298; H04J 14/0283; H04Q 2011/0037; H04L 45/48
(Continued)

(56) References Cited

U.S. PATENT DOCUMENTS 4,850,047 A * 7/1989 Iguchi ..................... H04J 14/08
                                                      398/45
4,947,389 A * 8/1990 Eng ..................... H04J 14/0283
                                                      370/403
(Continued)

OTHER PUBLICATIONS

Gumaste et al, Demonstration of Omnipresent Ethernet A Novel Metro End to End Communication System Using Binary Source Routing and Carrier Ethernet, Feb. 2010, JLT, vol. 28 N 4, pp. 596-607.*

*Primary Examiner* — Ken N Vanderpuye
*Assistant Examiner* — Dibson Sanchez (57) ABSTRACT

A network capable of being used in a datacenter is described. In some embodiments, the network can comprise a set of optical fiber rings, wherein each optical fiber ring carries data traffic on one or more wavelengths, and wherein each optical fiber ring is partitioned into multiple sectors. A reconfigurable optical add-drop multiplexer (ROADM) can be coupled to at least one optical fiber in each of at least two sectors. An electro-optical-switch can be coupled to each ROADM in each of the at least two sectors. A set of switches can be coupled to each electro-optical-switch in each of the at least two sectors. The set of switches can comprise a first layer of aggregation switches that is coupled to a second layer of edge switches, wherein the edge switches can be coupled to servers in a datacenter.

15 Claims, 7 Drawing Sheets

(52) U.S. Cl.
CPC ...... *H04J 14/0269* (2013.01); *H04J 14/0283* (2013.01); *H04J 14/0298* (2013.01); *H04L 45/48* (2013.01)

(58) Field of Classification Search
USPC .............................. 398/48, 58–59, 79, 82–88
See application file for complete search history.

(56) References Cited

U.S. PATENT DOCUMENTS

| | | | | |
|---|---|---|---|---|
| 6,032,185 A * | 2/2000 | Asano | H04J 14/0227 | 709/227 |
| 6,084,694 A * | 7/2000 | Milton | H04J 14/0206 | 398/1 |
| 6,288,811 B1 * | 9/2001 | Jiang | H04J 14/0213 | 398/79 |
| 6,348,985 B1 * | 2/2002 | Jiang | H04J 14/0216 | 398/82 |
| 6,414,767 B1 * | 7/2002 | Blair | H04J 14/0227 | 370/424 |
| 6,590,681 B1 * | 7/2003 | Egnell | H04J 14/0204 | 398/59 |
| 6,751,192 B1 * | 6/2004 | Nakata | H04J 14/0227 | 370/222 |
| 6,798,993 B1 * | 9/2004 | Adams | H04J 14/021 | 398/115 |
| 7,184,666 B1 * | 2/2007 | Li | H04J 14/0204 | 398/81 |
| 7,206,510 B2 * | 4/2007 | Suzuki | H04J 14/02 | 398/3 |
| 7,499,647 B2 * | 3/2009 | Way | H04B 10/503 | 398/3 |
| 7,606,500 B2 * | 10/2009 | Hofmeister | H04J 14/0201 | 398/135 |
| 8,155,521 B2 * | 4/2012 | Chung | H04J 14/0219 | 398/45 |
| 8,175,107 B1 * | 5/2012 | Yalagandula | H04L 45/66 | 370/408 |
| 8,670,669 B2 * | 3/2014 | Gazzola | H04J 14/0204 | 398/45 |
| 2002/0018616 A1 * | 2/2002 | Li | H04J 14/0283 | 385/24 |
| 2002/0075538 A1 * | 6/2002 | Jiang | H04J 14/0216 | 398/83 |
| 2003/0033555 A1 * | 2/2003 | Joyner | G06F 11/2007 | 714/11 |
| 2003/0156845 A1 * | 8/2003 | Persson | H04B 10/275 | 398/141 |
| 2003/0185567 A1 * | 10/2003 | Kurumida | H04J 14/0204 | 398/79 |
| 2003/0235412 A1 * | 12/2003 | Dotaro | H04J 14/0227 | 398/33 |
| 2004/0141746 A1 * | 7/2004 | Oberg | H04J 14/0213 | 398/59 |
| 2004/0175071 A1 * | 9/2004 | Oberg | H04J 14/0204 | 385/24 |
| 2005/0185959 A1 * | 8/2005 | Kinoshita | H04J 14/0227 | 398/59 |
| 2006/0034610 A1 * | 2/2006 | Akiyama | H04J 14/0204 | 398/83 |
| 2006/0133811 A1 * | 6/2006 | Gumaste | H04J 14/0227 | 398/83 |
| 2006/0210274 A1 * | 9/2006 | Lichtman | H04J 14/0201 | 398/83 |
| 2006/0257143 A1 * | 11/2006 | Cavazzoni | H04J 14/0241 | 398/49 |
| 2007/0025729 A1 * | 2/2007 | Barnard | H04J 14/0204 | 398/5 |
| 2008/0002570 A1 * | 1/2008 | Kurokawa | H04L 12/462 | 370/219 |
| 2008/0118245 A1 * | 5/2008 | Chang | H04J 14/021 | 398/79 |
| 2008/0131128 A1 * | 6/2008 | Ota | H04J 14/0201 | 398/79 |
| 2009/0083822 A1 * | 3/2009 | Han | H04H 20/103 | 725/145 |
| 2010/0265849 A1 * | 10/2010 | Harel | H04L 12/462 | 370/256 |
| 2010/0306408 A1 * | 12/2010 | Greenberg | H04L 12/4633 | 709/238 |
| 2011/0116790 A1 * | 5/2011 | Sakauchi | H04J 14/0204 | 398/5 |
| 2011/0286743 A1 * | 11/2011 | McLaren | H04B 10/278 | 398/45 |
| 2012/0020663 A1 * | 1/2012 | McLaren | H04B 10/801 | 398/48 |
| 2012/0170932 A1 * | 7/2012 | Chu | H04J 14/0202 | 398/48 |
| 2012/0243403 A1 * | 9/2012 | Hu | H04L 61/103 | 370/217 |
| 2012/0321309 A1 * | 12/2012 | Barry | H04J 14/00 | 398/51 |
| 2013/0243431 A1 * | 9/2013 | Pointurier | H04B 10/29 | 398/48 |
| 2014/0023373 A1 * | 1/2014 | Tosaki | H04J 14/0204 | 398/83 |
| 2014/0270776 A1 * | 9/2014 | Jinno | H04J 14/0204 | 398/69 |

\* cited by examiner

Operation after restoration

FIG. 7A

Normal operation

FLEXIBLE INTERCONNECTION OF SCALABLE SYSTEMS INTEGRATED USING OPTICAL NETWORKS FOR DATACENTERS

RELATED APPLICATION

This application claims priority to Indian Patent Application No. 1980/MUM/2013, entitled "Flexible Interconnection of Scalable Systems Integrated using Optical Networks for Datacenters," by the same inventors, filed on 10 Jun. 2013, the contents of which are herein incorporated by reference in their entirety for all purposes.

BACKGROUND

Technical Field

This disclosure relates to computer networking More specifically, this disclosure relates to flexible interconnection of scalable systems integrated using optical networks for datacenters.

Related Art

Datacenters (DCs) are considered as the brain of the Internet—storing repositories of easily accessible information. The architecture of datacenters has gathered significant attention in the recent years. The classical model of providing top-of-the-rack switches in a hierarchical fashion and interconnecting these to an edge router is well deployed. This architecture has two limitations: (1) providing scalability of the DC interconnection fabric, and (2) scaling a protocol to support the vast number of systems (servers, storage). With the surge of social media, explosion of video content, latency sensitive applications being consumed by mobile backhaul and the general thought of gigabit-to-the-home, there is a tremendous stress on the data-center infrastructure. The DC must now scale to meet the requirements of applications, some of which interact within the data-center environment as well as have latency tolerance that causes severe testing of service provider service level agreements (SLAs).

The common methodology of data-center design is to deploy a large number of commonly available off-the-shelf computing elements interconnected across a redundant networking fabric. To meet the scalability of the networking fabric, the key-requirement is to be able to provision 10s of 1000s of servers in an efficient and fault-tolerant mechanism within the DC. Bandwidth bottlenecks are created by traditional hierarchical designs and it becomes difficult to meet the requirements of full bisection bandwidth as the number of servers increases.

A second problem that arises from this scalability is to support protocol within the DC environment. The common Layer 2-3 protocols of Ethernet and IP do not scale in such environments. Ethernet has issues of scalability when used in its conventional form of Ethernet bridges. Internet Protocol (IP) scales, but the processing of IP packets at each branch and leaf in a hierarchical tree within the DC environment causes unacceptable processing delays and is expensive.

SUMMARY

Some embodiments disclosed herein provide an incrementally scalable network that is technically and financially feasible and that is capable of being deployed in a datacenter to interconnect a large number (e.g., hundreds of thousands or millions) of systems with one another.

In some embodiments, the network can comprise a set of optical fiber rings, wherein each optical fiber ring carries data traffic on one or more wavelengths, and wherein each optical fiber ring is partitioned into multiple sectors. A reconfigurable optical add-drop multiplexer (ROADM) can be coupled to at least one optical fiber in each of at least two sectors. An electro-optical-switch can be coupled to each ROADM in each of the at least two sectors. A set of switches can be coupled to each electro-optical-switch in each of the at least two sectors. The set of switches can comprise a first layer of aggregation switches that is coupled to a second layer of edge switches, wherein the edge switches can be coupled to servers in a datacenter. At least one sector can include one or more gateway switches that are coupled to an external network.

In some embodiments, the set of optical fiber rings comprises clockwise optical fiber rings and counter-clockwise optical fiber rings, wherein the set of optical fiber rings are configured to perform protection switching upon detecting a failure.

In some embodiments, packets are routed within the network based on a binary tree, wherein the binary tree includes a virtual root node, a set of dummy nodes, and a set of physical nodes, wherein each switch in the set of switches corresponds to a physical node in the binary tree.

In this disclosure, unless otherwise stated, the term "based on" means "based solely or partly on."

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer Networks

Computer networking is typically accomplished using a layered software architecture, which is often referred to as a networking stack. Each layer is usually associated with a set of protocols which define the rules and conventions for processing packets in that layer. Each lower layer performs a service for the layer immediately above it to help with processing packets. The Open Systems Interconnection (OSI) model defines a seven layered network stack.

At a source node, each layer typically adds a header as the payload moves from higher layers to lower layers through the source node's networking stack. A destination node typically performs the reverse process by processing and removing headers of each layer as the payload moves from the lowest layer to the highest layer at the destination node.

A network can include nodes that are coupled by links in a regular or arbitrary mesh topology. A networking stack may include a link layer (layer 2 in the OSI model) and a network layer (layer 3 in the OSI model). The link layer (e.g., Ethernet) may be designed to communicate packets between nodes that are coupled by a link, and the network layer (e.g., Internet Protocol or IP for short) may be designed to communicate packets between any two nodes within a network.

A device that makes forwarding decisions based on information associated with the link layer is sometimes called a switch. A device that makes forwarding decisions based on information associated with the network layer is sometimes called a router. The terms "switch" and "router" are used in this disclosure interchangeably to refer to a device that is capable of making forwarding decisions based on information associated with the link layer and/or the network layer.

Unless otherwise stated, the term "IP" refers to both "IPv4" and "IPv6" in this disclosure. The use of the term "frame" is not intended to limit the disclosed embodiments to the link layer, and the use of the term "packet" is not intended to limit the disclosed embodiments to the network layer. In this disclosure, terms such as "frame," "packet," "cell," "datagram" etc. are generally intended to refer to a group of bits.

An Incrementally Scalable Network

Some embodiments described herein use three technologies: (1) a modified Carrier Ethernet (CE) protocol for use within the data-center; (2) orthogonal frequency division multiplexing (OFDM) transponders and ultra dense wavelength division multiplexing (UDWDM) optics to provide scalable use of the fiber as well as providing a speedup in the backplane and (3) an optical bus (light-trail) as a mechanism to provide one-to-many connectivity in the backplane in a switchless-set up.

Some embodiments described herein use an optical ring (with wavelength-bus support) as a switching backplane interconnected with layers of Carrier Ethernet-centric switching zones called sectors. In some embodiments, the network is divided at the fiber backplane into sectors—each of which can support a cluster of servers and storage devices (henceforth called as systems). The fiber ring(s) subtend the sectors. Sectors are interconnected using UDWDM optics. Each ring subtends a bus architecture (at a sector interconnection point), whose basic functionality is implemented using light-trails, wherein each light-trail provides unidirectional one-to-many functionality. A system in the DC can add data using a single fiber ring, while data from the backplane can be dropped at a sector from any of the fiber rings. Each sector consists of (a) an optical bus supporting ROADM cross-connect with associated UDWDM optics, (b) aggregation switches (AS) and (c) edge switches (ES). Systems are connected to the ESs, while ESs are interconnected via a second layer of ASs.

Figure 1:
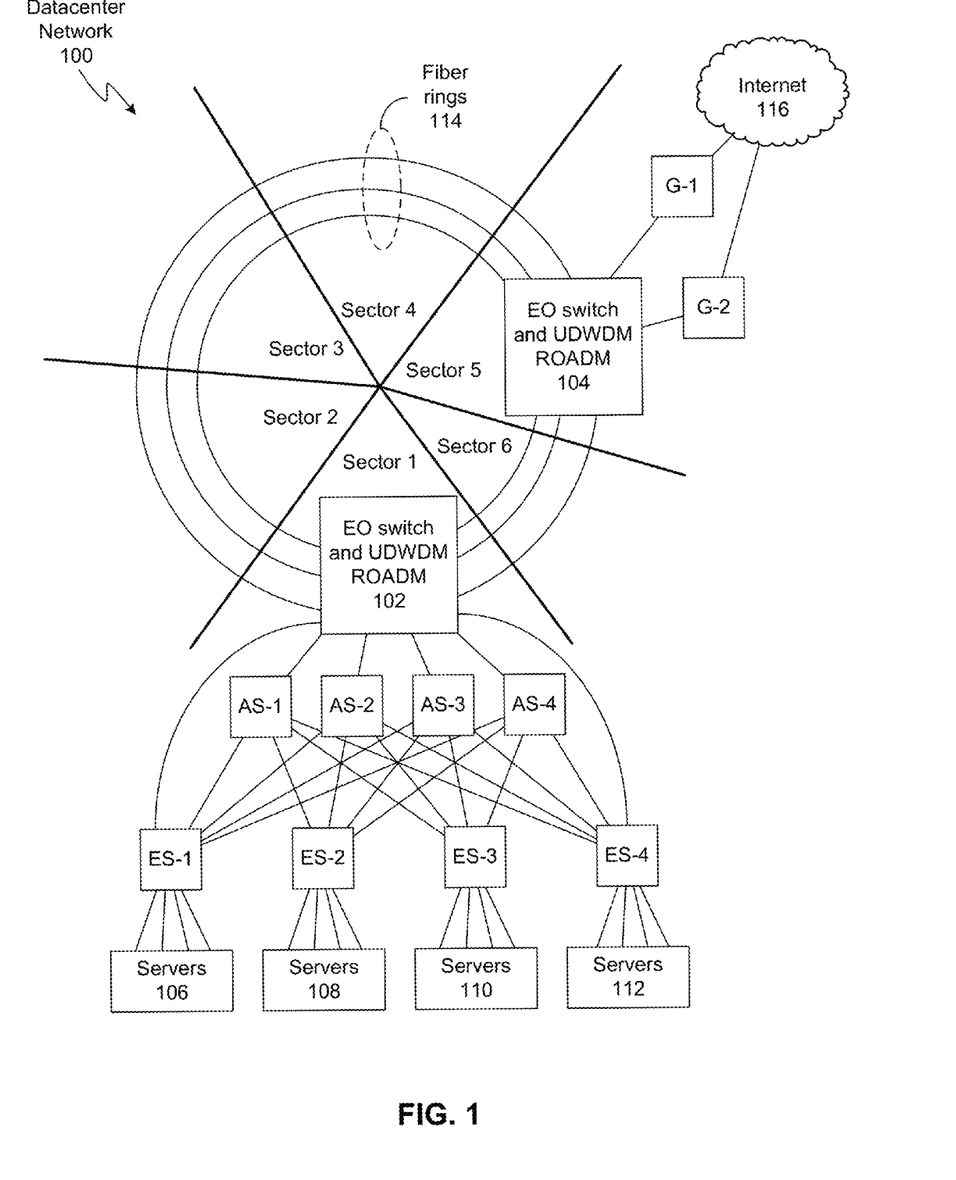
FIG. 1 illustrates an embodiment of an incrementally scalable network in accordance with some embodiments described herein.

FIG. 1 illustrates an embodiment of an incrementally scalable network in accordance with some embodiments described herein.

Datacenter 100 includes fiber rings 114 that provide an optical backplane. The optical backplane is divided into sectors, e.g., sectors 1-6. Each sector includes an electro-optical (EO) switch and UDWDM ROADM (e.g., EO switches and UDWDM ROADMs 102 and 104) that is used for communicating with other sectors through the optical backplane.

In one sector (e.g., sector 5), the EO switch and UDWDM ROADM can be coupled to gateway switches (e.g., gateway switches G-1 and G-2) that communicate with an external network (e.g., Internet 116). In another sector (e.g., sector 1), the EO switch and UDWDM ROADM can be coupled to a set of aggregation switches (e.g., AS-1 through AS-4). The aggregation switches can be coupled to edge switches (e.g., ES-1 through ES-4). Servers (e.g., servers 106-112) can be coupled to the edge switches.

The ASs provide interconnection between the ESs. The ESs are connected to the top-level ROADM cross-connects (called Electro-Optical Switches or EOS). The ES-EOS connection is unidirectional (though bidirectional support is possible—but not required) to support flows from being sent directly to other sectors. The EOS is connected to the ASs in another series of unidirectional connections. The backplane involves the interconnection of the optical bus in a ROADM (using commercially available Wavelength Selectable Switches (WSS) supporting OFDM transponders that are individually connected to muxponders. Muxponders are used for speedup.

The working of the system can be explained in two levels of communication—intra-sector and inter-sector. In the following description, the intra-sector architecture is described first, and then the interconnection architecture is described for communication between sectors using the optical backplane.

Intra-Sector Architecture

For communication within a sector, systems are connected to an N×2N ES, where 3N is the number ports of an ES. The ES supports a modified variant of Carrier Ethernet (described below). The ESs are interconnected to each other through ASs. The AS can be viewed as an N×N switch with additional N unidirectional ports that facilitate interconnection with the backplane. The topmost level within a sector is the WSS based EOS. The EOS consists of a series of muxponders (opto-electro-opto devices) that aggregate traffic by mapping these onto wavelengths thereby providing for an effective speedup (between the line-rate of the systems and the backplane) that is necessary to achieve scale. For example, each server is expected to pump data at 10 Gbps, while the backplane supports 40 Gbps/wavelength. Mapping 4-server channels onto a UDWDM sub-carrier is done by muxponders. The optical signals are multiplexed using a UDWDM multiplexer (usually a WSS) and then sent into a fiber ring using an Add Coupler (AC). At the drop side, signal can be dropped from any of the fiber rings. We assume that there are F fiber rings in the backplane. Each ring subtends a Drop Coupler that splits incoming signal into two parts (power splitting), dropping one copy of the signal onto a Drop-WSS of configuration 1×H+n−2 (this configuration is described below).

Inter-Sector Architecture

For inter-sector communication, each sector is connected to a fiber ring in the transmit side and to one-or-more fiber rings at the receive side. Each sector is allocated a fixed number of wavelengths (sub-carriers/super-channels) that can be used for transmission, while it can receive from any channel in any of the F fibers. The EOS sends these wavelengths that are combined in the WSS (shown in FIG. 2 below) to create a composite UDWDM signal. At the drop-side, an optical coupler is used that potentially drops the entire UDWDM spectrum (channels from other sectors) on to a Drop-WSS (configuration: 1×H+n−2). The choice of UDWDM enables us to maximally utilize the fiber bandwidth. Specifically, we are now able to use non-ITU grid optics and facilitate much closer spacing. We note that given the physical proximity of the sectors, the DC design is not limited by chromatic dispersion, polarization mode dispersion or fiber attenuation due to the couplers. With OFDM transponders and coherent optics, it is feasible to have 1000 channels (each at 40 Gbs) in the fiber for very short distances (such as in a DC). In our design we do not expect to exceed 400 channels across both C and L bands for current commercial requirements. The fiber ring is broken within the sector using a 1×1 optical switch to avoid recirculation of the optical signal and avoid amplifier saturation. In case of failure, the 1×1 switch is turned ON to enable restoration using a second counter-clockwise fiber.

The added signal is available at every sector in the optical ring using the optical bus functionality. Wavelengths can be reused across rings, but not within a ring. Multicast (and broadcast) is possible using the optical bus functionality. Signal sent by one sector can be received at any sector without optical switch configuration. By using passive optical couplers at the interconnection points of a sector, we avoid any active wavelength dependent switching elements in the transmission path. The broadcast and select architecture is hence ideal for the backplane. To scale the network, we simply add more sectors. These sectors will saturate a fiber ring, subsequent to which we will add more fiber rings in the backplane. Although some embodiments impose a limit on the number of sectors per ring, these embodiments do not impose a limit on the number of rings. In principle DCs with 1 million systems (e.g., servers and/or storage devices) can be created using the network embodiments described herein.

Figure 2:
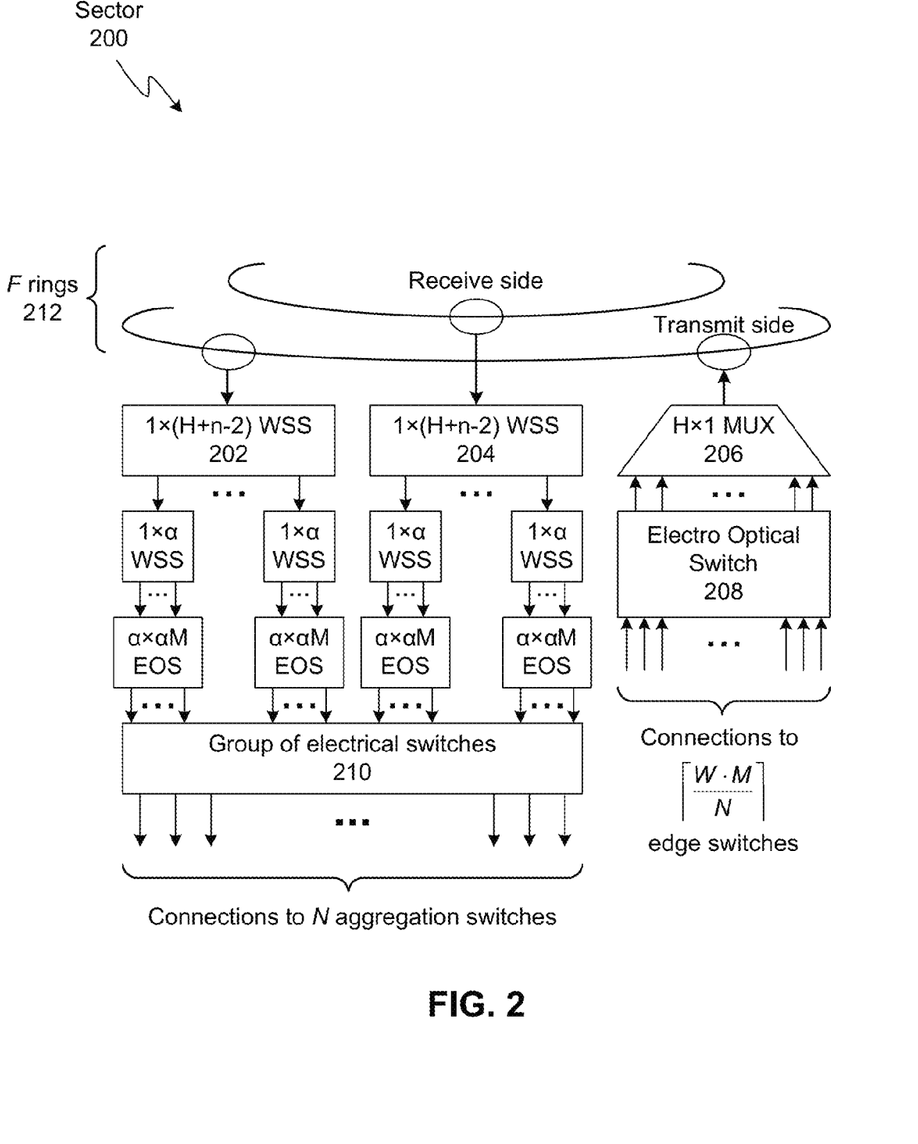
FIG. 2 illustrates an example of an inter-sector configuration in accordance with some embodiments described herein.

FIG. 2 illustrates an example of an inter-sector configuration in accordance with some embodiments described herein. Let the number of fiber rings be F (e.g., F rings 212). The number of wavelengths per ring is then denoted by a. Note that a could be sub-carriers in the case we use OFDM or just wavelengths in case of NRZ/CS-RZ modulation formats. For the sake of engineering implementation, let us assume that a as the number of subcarriers per super-channel. Then $$\alpha = \frac{\sigma}{\gamma}.$$

We also define γ as the number of super-channels per ring, and W as the number of sub-carriers (wavelengths) per sector. Let us further denote H as the number of super-channels per sector and $$H = \frac{W}{\alpha}.$$

The EOS has a muxponding gain denoted by M. This means that the sub-carriers are at a line-rate of M-times the line-rate of each server. The number of sectors per ring is therefore:

$$n = \left\lfloor \frac{\sigma}{W} \right\rfloor.$$

The number of servers supported in a sector=W·M and the number of servers per ring with full bisection bandwidth support is $$\left\lfloor \frac{\sigma}{W} \right\rfloor \cdot W \cdot M \approx \sigma \cdot M.$$

The architecture of sector 200 shown in FIG. 2 is as follows: each ES has a configuration of N×2N, where 3N is the port count of the ES.

$$\left\lceil \frac{W \cdot M}{N} \right\rceil$$

represents the upper bound on the number of ESs per sector. Finally, the AS will have a port configuration of:

$$\left\lceil \frac{W \cdot M}{N} \right\rceil \times \left\lceil \frac{W \cdot M}{N} \right\rceil.$$

At the optical side, for the transmit portion, we deploy an add WSS whose configuration is H×1 (e.g., H×1 multiplexer 206 in FIG. 2). The H×1 multiplexer 206 is coupled to EOS 208, which is coupled to $$\left\lceil \frac{W \cdot M}{N} \right\rceil$$

edge switches.

At the receive side we deploy a hierarchical WSS framework. There are two levels of WSSs, a top-level WSS and a bottom-level WSS, together called as the drop WSS. The top-level WSS has a 1×(H+n−2) configuration (e.g., top-level 1×(H+n−2) WSSs 202 and 204 that are coupled to two different fibers), while the bottom-level WSS has a 1×α configuration (e.g., the 1×α WSSs shown in FIG. 2). The assumption is that WSSs in both levels can filter channels at a base granularity of the super-channel. The 1×α WSSs are coupled to α×αM EOS switches, which are then coupled to a group of electrical switches 210. The group of electrical switches 210 are then coupled to N aggregation switches.

As an illustrative example, consider a datacenter with 100,000 servers and each server's physical network adapter can support 10 Gbps. In this example we need 391 sectors with each sector supporting 256 servers with an assumption of 384 channels each supporting 40 Gbps. Each fiber ring can now support a maximum of 6 sectors. Hence, to support 391 sectors, we need 66 fiber rings. If each wavelength can carry 40 Gbps then 256-servers sector require 64 wavelengths (sub-carriers) each. These 64 wavelengths are grouped into super channels into the optical backbone. Each sector requires 16 ESs of configuration 16×32 and 16 ASs of 16×16 configuration for complete interconnection of all servers within a sector.

As another illustrative example, consider a datacenter with 1 million systems. In this example, we need 3907 sectors of size 256 servers and 652 fiber rings. Similarly, in yet another example, for 10 million nodes, 39063 sectors and 6511 fiber rings are needed. The table shown below showcases the almost infinite scalability of the DC.

|  | Number of Servers | | | | |
| --- | --- | --- | --- | --- | --- |
|  | $10^3$ | $10^4$ | $10^5$ | $10^6$ | $10^7$ |
| # of ES/sector | 16 | 16 | 16 | 16 | 16 |
| ES port density | 16 × 32 | 16 × 32 | 16 × 32 | 16 × 32 | 16 × 32 |
| # of AS per sector | 16 | 16 | 16 | 16 | 16 |
| AS port density | 16 × 16 | 16 × 16 | 16 × 16 | 16 × 16 | 16 × 16 |
| # of sectors | 4 | 40 | 391 | 3907 | 39063 |
| # of fiber rings (F) | 1 | 7 | 66 | 652 | 6511 |

A bound for the number of super-channels being dropped at a sector can be determined as follows. Let $S=\{s_1, s_2, \ldots, s_n\}$ denote the set of sectors per ring where $|S|=n$. Let C be the total capacity of a super-channel. Any sector $s_j$ can use p super-channels to send data to sector $s_i$, where $1 \leq p \leq H$. Any super-channel can carry traffic $x_{ji}$ from sector j to sector i, where $0 < x_{ji} \leq C$. For a given sector $s_i$, the maximum data traffic that can be received is (H×C). Then, $$\sum_{j=1, j \neq i}^{n} (\text{Data sent by } s_j \text{ to } s_i) \leq H \times C.$$

Let us assume that a sector $s_l$ is sending data to $s_i$. Suppose p=H, such that (H−1) super-channels are fully used and the sole remaining super-channel carries traffic $x_{li}$. If all the remaining sectors are also sending data to sector $s_i$, such that: $x_{ji} > 0$, where $j \in \{1, 2, \ldots, n\} - \{l, i\}$. Then, from the above two equations we have:

$$x_{li} + \sum_{j=1, j \neq i, l}^{n} x_{ji} \leq C.$$

This implies that $s_i$ needs to drop H super-channels from sector $s_l$, and at the most (n−2) from the remaining sectors (except $s_i$ and $s_l$). Hence, the total number of super-channels that need to be dropped per sector=(H+n−2).

Communication Protocol

A protocol is now described for communication within the datacenter. The principal idea is to convert the entire DC into a series of binary trees (rooted at a virtual center of all the fiber rings) and create unique binary tags for every node in the DC. The result is that we are able to perform binary routing and source routing within each sector. We take logical binary addresses of nodes and routes between nodes (as binary strings) and map these to virtual local area network (VLAN) tags—a procedure described shortly. Since some embodiments described herein have a three layer hierarchy (EOS, AS and ES), we define three types of tags. The appropriate node (ES/AS/EOS) in the hierarchy forwards data using the corresponding tag. Mapping data coming from the Internet or from within the servers to the tags is done using a control plane at either the data-center interconnection point (DCIP) or at the ESs.

The protocol is based on the premise of Carrier Ethernet leading to a managed networking medium. To facilitate CE, we turn-off spanning tree protocol as well as medium access control (MAC) learning, the ESs are configured to have a limited response to address resolution protocol (ARP) broadcast. The ASs and the ESs perform switching/forwarding using a combination of user-defined VLAN tags (or labels, in the case of multi-protocol label switching transport profile (MPLS-TP) flavor of CE) and not on IP/MAC addresses. Such switching and forwarding is similar to the 802.1Qay standard. We define the following tags that facilitate forwarding within the DC environment: Source-Address Tag (SARTAG), Wavelength Tag (WATAG), Aggregation Switch Tag (ASTAG), and Destination Edge Tag (DETAG).

Figure 3:
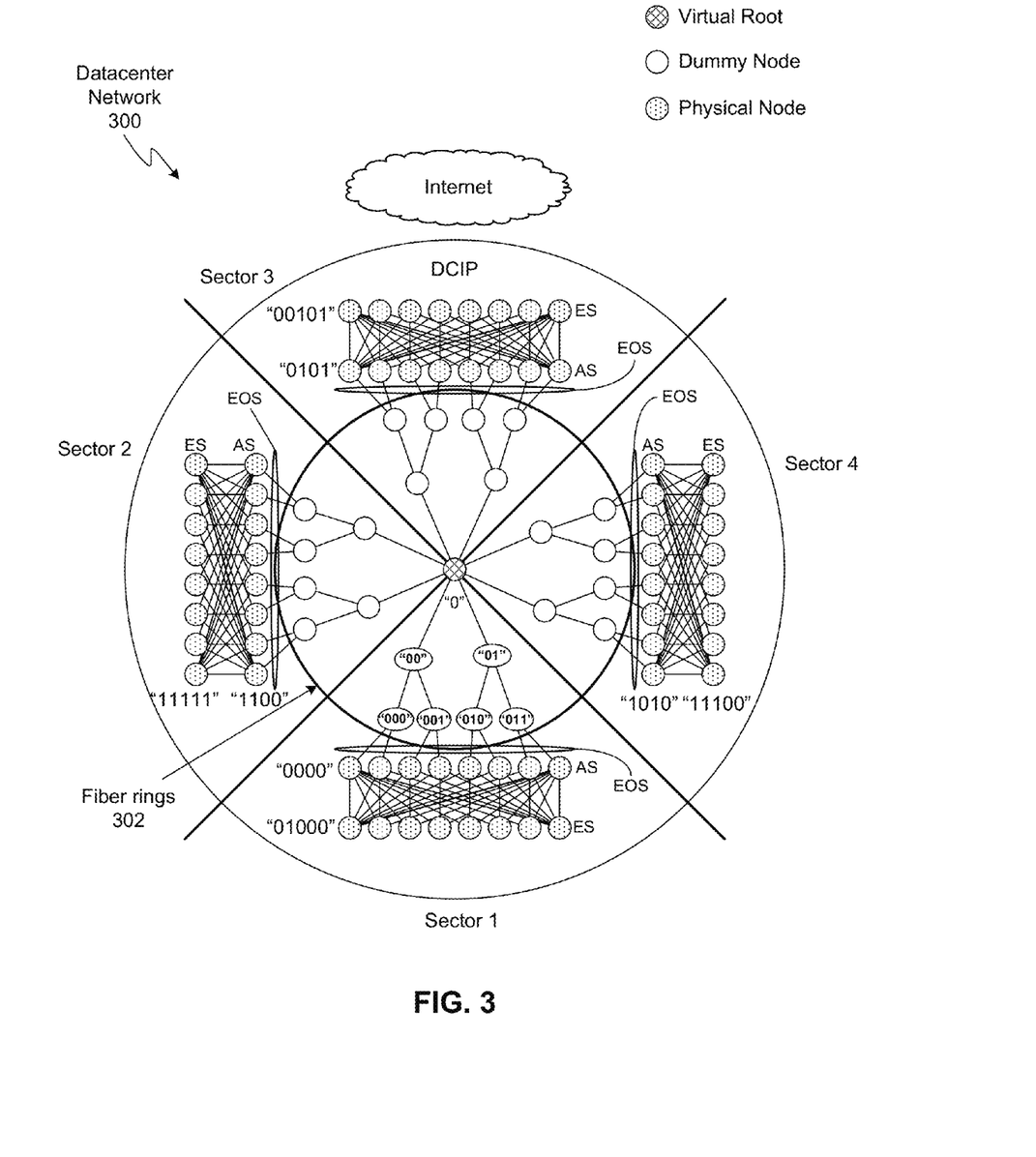
FIG. 3 illustrates how a binary-tree based protocol can be used for communication in the datacenter network in accordance with some embodiments described herein.

FIG. 3 illustrates how a binary-tree based protocol can be used for communication in the datacenter network in accordance with some embodiments described herein. Datacenter network 300 includes fiber rings 302 that form the optical backbone. The optical backbone is divided into four sectors (sectors 1-4), and each sector comprises an EOS layer, and AS layer, and an ES layer. Servers (not shown in FIG. 3) are coupled to the ES layer. Traffic is routed in datacenter network 300 using the above-mentioned binary-tree based protocol. SARTAG denotes the unique path in binary format from the ROADM interface to a server connected to an ES. For calculation of the SARTAG, we assume the entire sector to be a binary tree—by adding dummy nodes to convert all nodes whose degree of connectivity >1×2 to be binary nodes. As shown in FIG. 3, we add dummy nodes above each EOS to create a tree which will finally have a single virtual root.

The SARTAG for a particular ES port is then computed as follows. We begin with an empty string. We traverse the binary tree from the root to the edge (depth first search). As we traverse, for each right turn that we make (at a binary node), we add a 0 to the string, while for every left turn that we make, we add a 1. In this manner, the resulting string at the edge port would be the SARTAG for the edge port. The SARTAGs for some of the nodes have been shown in FIG. 3 as bit-strings within quotes. If the length of the string exceeds 16 bits, then multiple SARTAGs are conjoined together. The QoS bits in the SARTAG denote a pointer—based on which a node will process the tag. Similarly, every port/device in the DC has an SARTAG relevant to itself that is unique within the sector.

WATAG is a tag used by the EOS as it sends packets from one sector to another. It denotes the wavelength number, destination sector number, fiber ring number (if any) that the packet must use from the source sector to the destination sector. The WATAG is identified uniquely by its Ethertype. The WATAG determines the relationship between the ingress/egress sector and the wavelength (sub-carrier-super-carrier) number used for communication. In future, we could deploy dynamic wavelength allocation and signal these between sectors by use of the WATAG.

ASTAG is used to determine the correct route through an AS. The ASTAG denotes the binary route through the particular AS that a packet would take en route to its destination. The ASTAG is added at the EOS or the ES depending on the direction of the packet.

DETAG denotes the unique destination edge port path in the ESs. The tag denotes the binary route within the ES that a packet would take en route to its destination.

In some embodiments, the binary string from a source to the destination is encapsulated within an Ethernet frame in the aforementioned user-defined tags. By performing such encapsulation at the source node, we are able to take advantage of source routing, implying that there is no need for a look up at an intermediate node. With binary routing we are able to juxtapose the entire route as a binary string, implying that by examining 2 log N bits for an N×N node, we are able to forward the packet to the appropriate port. This results in low-latency as well as due to the limited processing requirement, leads to low energy consumption.

Figure 4:
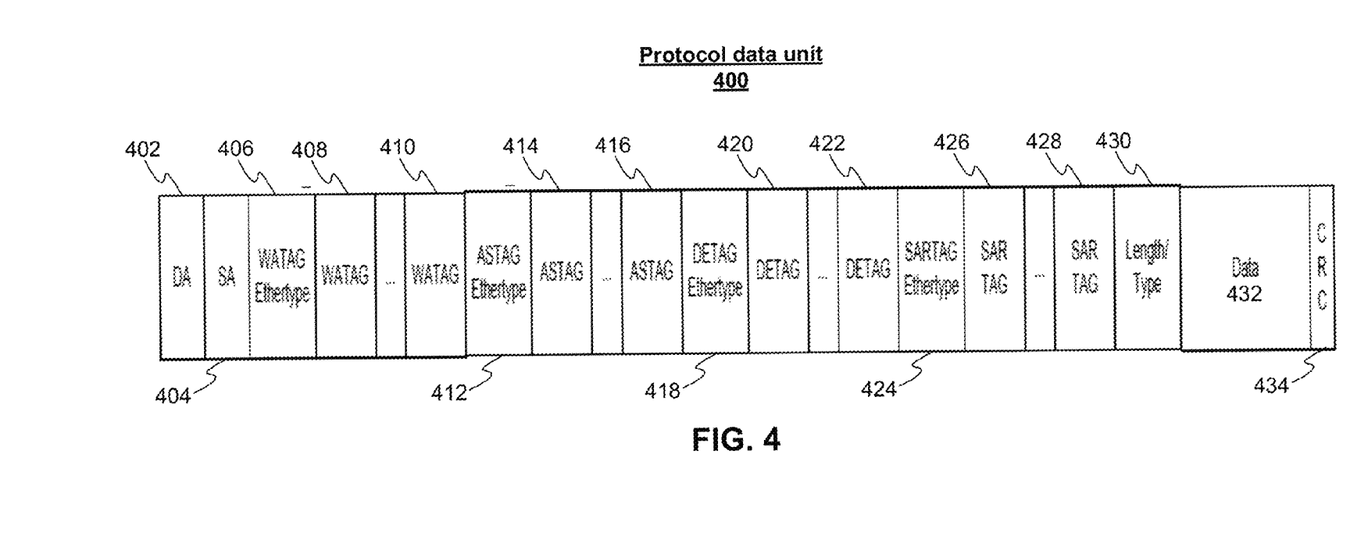
FIG. 4 illustrates a protocol data unit in accordance with some embodiments described herein.

FIG. 4 illustrates a protocol data unit in accordance with some embodiments described herein. Protocol data unit 400 can include the following fields: destination address 402, source address 404, WATAG Ethertype 406, one or more WATAGs 408-410, ASTAG Ethertype 412, one or more ASTAGs 414-416, DETAG Ethertype 418, one or more DETAGs 420-422, SARTAG Ethertype 424, one or more SARTAGs 426-428, a length and type 430 (the length specifies the length of the frame, and the type specifies the type of the frame), data 432 (i.e., the data payload), and a cyclic redundancy check (CRC) 434.

Figure 5:
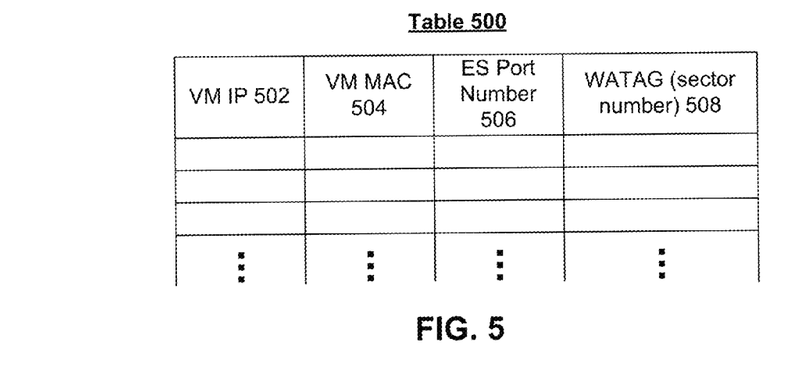
FIG. 5 illustrates a table that is used by the protocol in accordance with some embodiments described herein.

FIG. 5 illustrates a table that is used by the protocol in accordance with some embodiments described herein.

The control mechanism for the datacenter network described in this disclosure can have a three level hierarchy. The first hierarchy level comprises Generalized Ethernet Management System (GEMS). GEMS consists of a single management server that controls the entire DC. Any information stored is reported to the GEMS. The GEMS runs discovery algorithms that facilitate in the discovery of sectors, ESs and ASs as well as systems and VMs. The GEMS may also support IEEE 802.1ag connectivity fault management between any two points in the DC to provide for protection and restoration. The GEMS stores information in table 500. Any new information stored in the DC is routed based on table 500. No information can be stored in the DC without its mention in table 500.

The second hierarchy level comprises Localized Ethernet Management System (LEMS). The LEMS (localized to a particular sector) contains the same table as the GEMS, with two modifications: (1) an extra two columns mapping DETAG and ASTAG are added to Table 2, and (2) the contents of the LEMS table are only restricted to a particular sector.

The third hierarchy level comprises Management of Optical Backplane System (MOBS). The MOBS is responsible for the optical backplane, in particular for wavelength assignment (a dynamic wavelength assignment process is described below), mapping the wavelength to the muxponders' output, super-carrier-to-sub-carrier mapping as well as which channels to add and which to drop at a sector. A control plane is assumed that facilitates topology discovery, system discovery, VM discovery as well as interaction between the GEMS, LEMS and the MOBS. Initially GEMS configures all sectors with sector numbers. The MOBS creates an initial wavelength assignment for both add and drop circuits and informs this to the GEMS as well as the EOS of each sector. The ADD part of the EOS maintains remote sector number and its associated wavelengths. Whenever a packet arrives at the Add-portion of the EOS, it will examine the WATAG of the frame and identify the destination sector number. According to the wavelength assignment, the EOS will use the wavelength associated with the remote sector and send the packet to the optical backbone. Whenever a VM is created, the GEMS gets information of the VM from the DC Virtual Infrastructure Manager (vCenter/XenCenter). All the default-gateway's and load-balancer's IP and MAC addresses have to be configured manually in the GEMS. The GEMS populates all the essential information (pertaining to gateways, load balancers) into the LEMS of each sector. ARP can be handled by either ES or LEMS or GEMS by curtailing ARP broadcast as information about all VMs is now present at ES/LEMS/GEMS. Table 500 can include the following columns: VM IP address 502, VM MAC address 504, ES port number 506 that is coupled with the VM, and WATAG (sector number) 508 that contains the ES.

For example, if VM1 is located in sector1 and wants to send data to VM2 which is located in sector2. If VM1's OS is not changed to bypass ARP-cache look up, it will send an ARP request (broadcast). The ingress ES captures ARP broadcast packets and examines its LEMS table to find the target IP and its associated MAC. If the ES finds the associated MAC address, it creates an ARP reply and sends it to VM1, else the ES forwards (unicast) ARP request to the GEMS. The GEMS is guaranteed to have the information about every VM and can create an ARP reply. If VM1's OS is modified to bypass ARP, then it can directly send data packets to the ES. On reception of the data packet, the ES examines the destination IP address and performs look-up in its local cache. As VM2 belongs to another sector, the ES may or may not contain VM2's information in its local cache. On acquiring VM2 location (WATAG), the ES inserts the WATAG into the frame and forwards packet to Add-EOS. The EOS examines WATAG and finds its appropriate wavelength by doing a look up in its local cache and injects the packet into optical backbone. The Drop-EOS in sector-2 was configured to access data on this wavelength by MOBS. The electrical part of EOS then examines WATAG to ensure this packet belongs to its own sector. The EOS then removes the WATAG and forwards the packet to any one of the AS based on ASTAG. The AS inserts the DETAG by examining the IP address and forwards it to the appropriate ES and hence to the appropriate VM (here VM2).

The operation of the protocol is now described. Two cases are considered that exhaustively describe the protocol. The first case is when the communication originates from outside the DC. In this case an access to information is made from outside the DC. The incoming query/packet with the appropriate destination IP-address (pointing to the destination server/VM) arrives at the DCIP. The DCIP checks against its LEMS/GEMS Table for the corresponding SARTAG, ASTAG, WATAG and DETAG and encapsulates the packet into the requisite CE PDU. The packet is then sent into the backplane, from where it is picked up by the appropriate sector (based on WATAG matching). The egress sector then checks for the destination IP match in its LEMS and then sends the packet to the ES through the AS (both of which forward based on ASTAG and DETAG respectively). If the DETAG, ASTAG and SARTAG are available in the LEMS table, then these are encapsulated. The packet is then sent to the AS which forwards it to the appropriate port using the relevant (2 log N) bits of the ASTAG. The appropriate ES now gets the packet and forwards it to the destination system using its relevant 2 log N bits of the corresponding DETAG.

The second case is when the communication originates within the datacenter. This case is prevalent for server-to-server or server to an external client communication. The ingress server sends a packet with only the destination IP address encapsulated in an Ethernet frame. The ES checks the destination IP address of the incoming packet against its LEMS table. If an entry exists then the appropriate SARTAG, DETAG and ASTAG are encapsulated in a new Ethernet frame into which the contents of the incoming packet are transferred. If however no entry exists, then it implies that the destination IP address is either in some other sector or outside the DC. The packet is then sent to the EOS using the least-loaded link. At the EOS, the GEMS table is invoked to fetch the corresponding entry for this destination IP address. The invoking of the GEMS table is done through the control plane that facilitates interaction between the GEMS and the LEMS. The packet is now encapsulated with the appropriate WATAG, ASTAG and DETAG. If the packet is destined to within the DC, the destination sector will pick it up, else the sector that contains the DCIP will pick the packet. The WATAG will in this case determine the appropriate sector.

Figure 6:
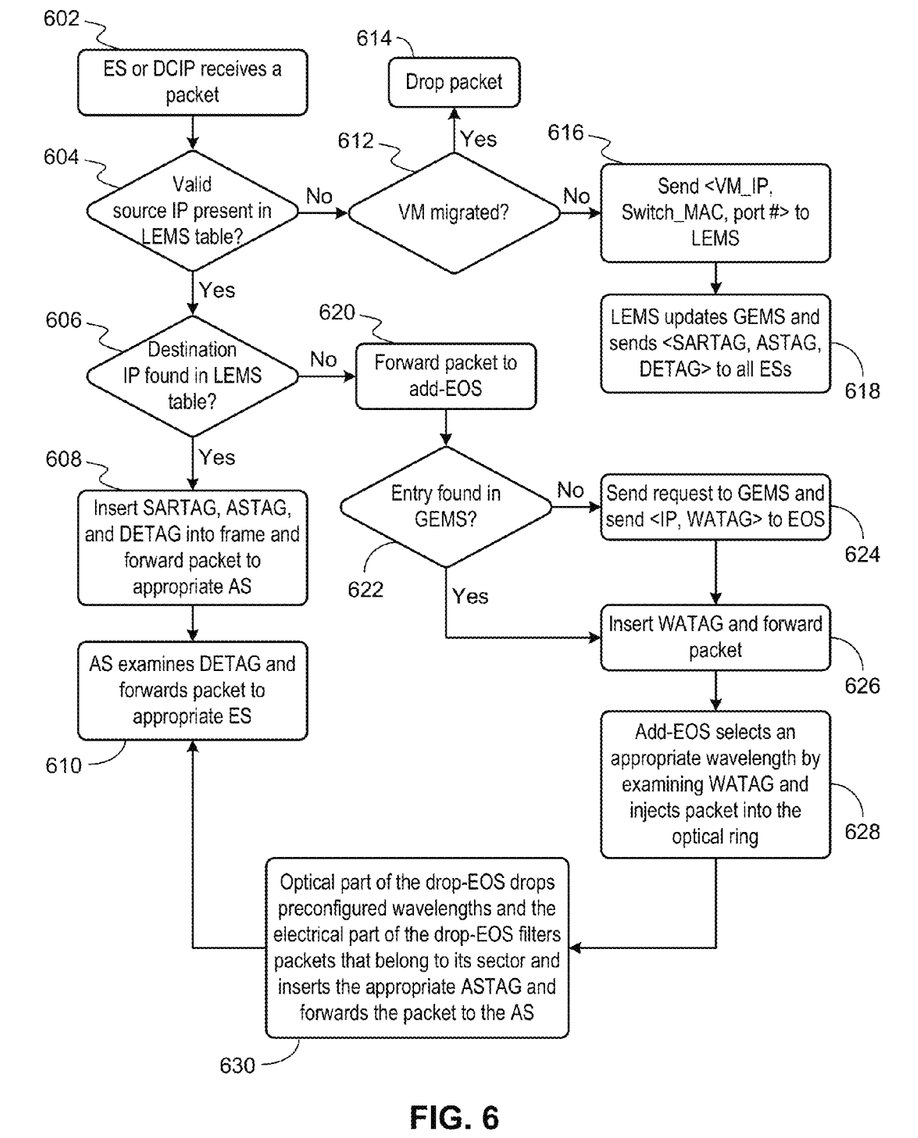
FIG. 6 present a flowchart that illustrates the operation of the protocol in the datacenter in accordance with some embodiments described herein.

FIG. 6 present a flowchart that illustrates the operation of the protocol in the datacenter in accordance with some embodiments described herein. The ES (for traffic that originates within the DC) or the DCIP (for traffic that originates outside the DC) receives a packet (step 602). Next, the system determines whether or not a valid source IP is present in the LEMS table (step 604). If a valid source IP is present, then the system determines if a destination IP is found in the LEMS table (step 606). If the destination IP is found in the LEMS table, then an SARTAG, ASTAG, and DETAG are inserted into the frame and the packet is forwarded to the appropriate AS (step 608). The AS then examines the DETAG and forwards the packet to the appropriate ES (step 610).

Referring back to step 604, if a valid source IP is not present in the LEMS table, the system checks if the VM migrated (step 612). If the VM migrated, then the packet can be dropped (step 614). On the other hand, if the VM did not migrate, then the IP of the VM, the MAC of the switch, and the port number are sent to LEMS (step 616). Next, LEMS updates GEMS and sends the corresponding SARTAG, ASTAG, and DETAG to all ESs (step 618).

Referring back to step 606, if the destination IP is not found in the LEMS table, then the packet is forwarded to the add-EOS, i.e., the EOS that adds traffic to the optical backbone (step 620). Next, the system determines if the entry was found in GEMS (step 622). If the entry was found in GEMS, then the system inserts WATAG and forwards the packet (step 626). On the other hand, if the entry was not found in GEMS, then a request is sent to GEMS and the IP with the WATAG is sent to EOS (step 624), and then the process performs step 626. Next, the add-EOS selects an appropriate wavelength by examining WATAG and injects packet into the optical ring (step 628). The packet travels through the optical ring until it reaches the drop-EOS. The optical part of the drop-EOS then drops preconfigured wavelengths and the electrical part of the drop-EOS filters packets that belong to its sector, inserts the appropriate ASTAG, and forwards the packet to the AS (step 630).

Protection Mechanism

Figure 7A:
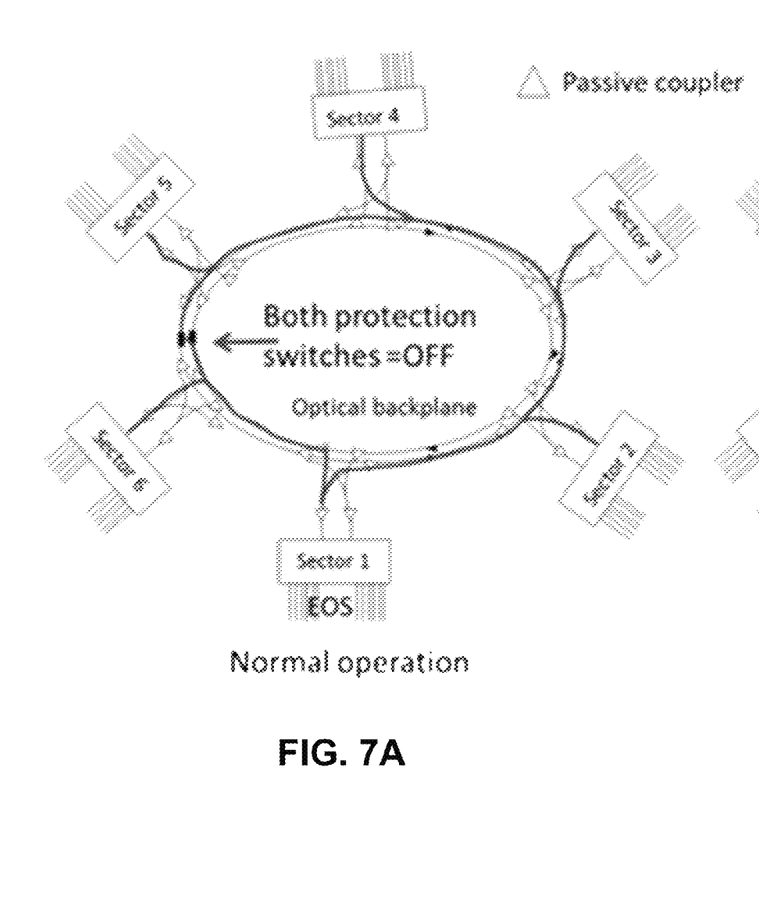
FIGS. 7A and 7B illustrate a protection mechanism in the optical backplane of the datacenter network in accordance with some embodiments described herein.
Figure 7B:
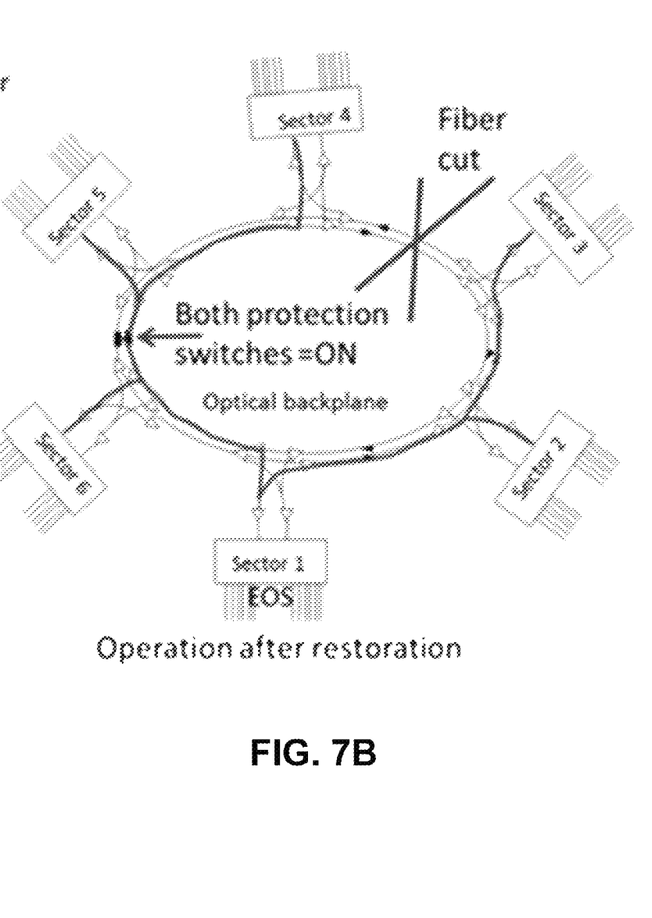

FIGS. 7A and 7B illustrate a protection mechanism in the optical backplane of the datacenter network in accordance with some embodiments described herein. As shown in the figure, the backplane can include a two-fiber ring system, with counter-propagating rings. The optical backplane is divided into six sectors. Signal from a sector is sent into both counter propagating rings by using a splitter that is connected to the output of the transponder at the EOS. Similarly for the drop part, drop couplers in both the fiber rings are connected to a combiner coupler at ingress of the receiver transponder, though signal from only one ring actually drops into a sector (as the rings are open using a 1×1 optical switch). The 1×1 optical switch is used only for the purpose of protection—it is turned ON when a loss of signal is detected in the other ring. In the normal case of operation, i.e., when there is no fiber-cut in the backplane, signal from any sector is split at the ingress as it exits the EOS. One copy of the signal is sent to the clockwise (CW) fiber, while the other copy is sent to the counter-clockwise (CCW) fiber. In case of a fiber-cut or EOS-coupler failure, the signal has to be restored. This happens in the following steps: (1) the switch in both fiber rings that converts the closed ring to an open ring, detects loss of signal; (2) the switch in the fiber ring in which there is loss of signal now turns from OFF to ON; (3) the ring in which the fiber-cut/EOS-coupler failure occurs is now restored by the switch turning ON—and the signal is now collected by the drop coupler without any local switch configuration. In this way protection is accomplished in the optical backplane.

Figure 8:
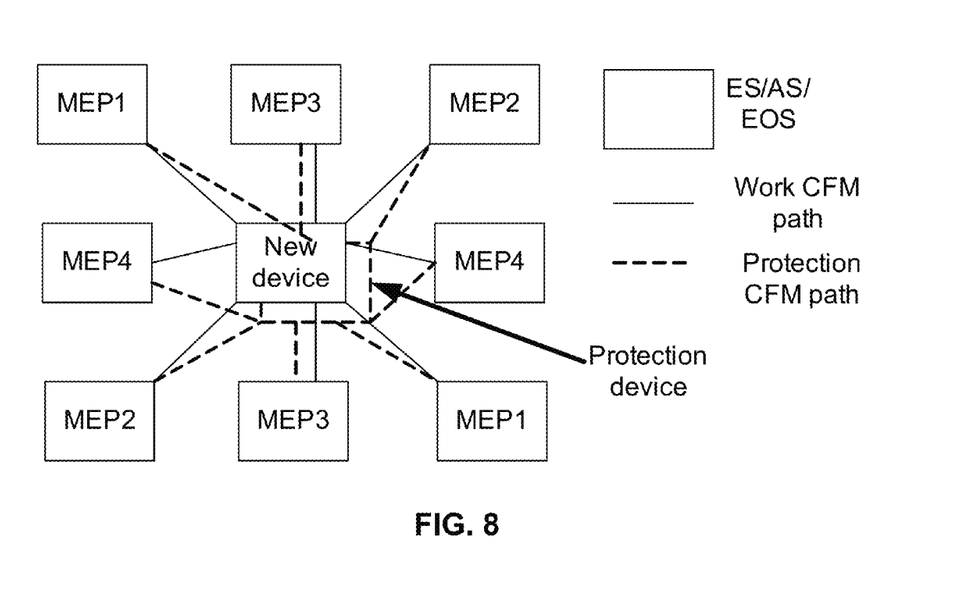
FIG. 8 illustrates how protection can be implemented in a sector in accordance with some embodiments described herein.

FIG. 8 illustrates how protection can be implemented in a sector in accordance with some embodiments described herein. In some embodiments, protection in the sector can be done by using the IEEE 802.1ag Connectivity Fault Management standard for Carrier Ethernet fault isolation, protection and restoration. It is assumed that there are ELINEs created between the ES and the EOS—as a default service, even if data does not flow. When the network management system finds a new device in the network (ES/AS/EOS), it creates an ELINE between this new device and its neighbors. To protect this device, management end points (MEPs as defined in IEEE802.1ag) are created at each neighbor of the newly discovered device. These MEPs (e.g., MEP1 through MEP4 shown in FIG. 8) exchange periodic messages called Connectivity Check Messages (CCMs). 802.1ag works on the principle that when an MEP does not receive 3 consecutive CCMs, it indicates that the device has gone down, as a result, triggering failure. The egress MEP monitors CCMs on both the work and the protection path. In the event of a failure (and not receiving 3 consecutive CCMs), the egress MEP, simply switches from the work-path to the protection path. This implies that all the devices (EOS/AS/ES) connected to the failed device now switch from the work device to the protection device.

Dynamic Wavelength Assignment

A dynamic wavelength assignment process that can be performed by MOBS is now described. The process periodically computes traffic statistics (averaged between a source-destination pair) from the add-part of each EOS and dynamically reconfigures the drop-part of the EOS at the egress sector. The process also updates the MOBS Table of an add-EOS when the WSS of a remote drop-EOS is reconfigured. The detailed wavelength assignment process is as described below:

Each sector can receive H+n−1 super-channels (H+n−2 if the sender and the receiver are in the same fiber). Initially each sector is allocated (H+n−1)/n number of super-channels to be used to transmit data for an intended destination sector. For example, a ring has 6 sectors and each sector uses 64 wavelengths (sub-carrier) that are grouped into 16 super-channels. Hence, the drop-WSS of any sector connected to this ring must be able to drop at least H+n−2=20 super-channels and sectors connected to other rings must be able to drop H+n−1=21 super channels. Initially each sector is allowed to send data to any remote sector with an average of (H+n−1)/n=3.5 complete super channels. The MOBS configures each add-EOS with super-channels being dropped by each and every remote sector. The sender can use a single super-channel for multiple destination sectors. In this case, the electrical part of the destination sector's drop-EOS filters data packets that belong to its own sector by using a WATAG match.

If a sector desires to use more number of super-channels than the number of super-channels allocated ((H+n−1)/n), then the sector has to send a request to the MOBS. The requirement for the new channel is detected prior to the point in time when data packets begin to get dropped due to insufficient number of super-channels being used and buffer overflow at the add-EOS. We use a threshold to identify the requirement of new channel. The threshold is dependent on the WSS reconfiguration time, rate of change of data traffic from the source sector to the destination sector and OBMS request processing time. This threshold is defined as $$\Theta = C - \left(\frac{dTij}{dt}\right) * (T_p + T_R),$$

where C is the capacity of the super channel, $T_{ij}$ is the instantaneous traffic, $T_p$ is the request processing time and $T_R$ is the WSS reconfiguration time. The add-part of each EOS runs the following process and sends a new super-channel request to MOBS whenever the instantaneous traffic $T_{ij}$ reaches the threshold value. The idea of the threshold is that, it gives us an estimate as to when to begin the wavelength assignment, so that we can add a new wavelength without dropping of any packets (due to wavelength unavailability). The following pseudocode summarizes this process.

```
init: Tij = traffic from sector i to sector j;
while (true) {
    send traffic statistics to MOBS periodically;
    for j = 1 to N {
        if (Tij > Θ) {
            Send request for new super-channel to
            MOBS;
                Update super-channel list after new
            channel has been allocated;
        }
    }
}
```

The MOBS periodically collects traffic statistics from each EOS and calculates free super channels. Upon reception of a super-channel request, the MOBS finds a sector on the same ring which has not been utilizing all of its allocated super-channels, if no such sector is available, then the MOBS indicates the use of a new fiber ring backbone. After finding a suitable candidate sector the MOBS tunes the receiver sector's WSS and allocates a new super-channel to the requested sector. This whole process can take few milliseconds. By the use of appropriate threshold to avoid data-drop due to insufficient number of super-channel we are able to successful allocate new channels without loss of data. The following pseudocode summarizes this process.

```
init:
    matrix T[i][j] = List of channels allocated for
    data transmission from sector i to sector j;
    matrix U[i][j] = List of channels being used for
    transmission from sector i to sector j;
    matrix R[i][j] = Request for new channel from
    sector i for remote sector j;
    do initial wavelength assignment (fair allocation),
and update matrix A;
    while (true) {
        read traffic statistics from each EOS and update
        matrix U accordingly;
            identify unused channels based on matrix U;
            process matrix R, and update matrices A and U;
    }
```

Computer System

Figure 9:
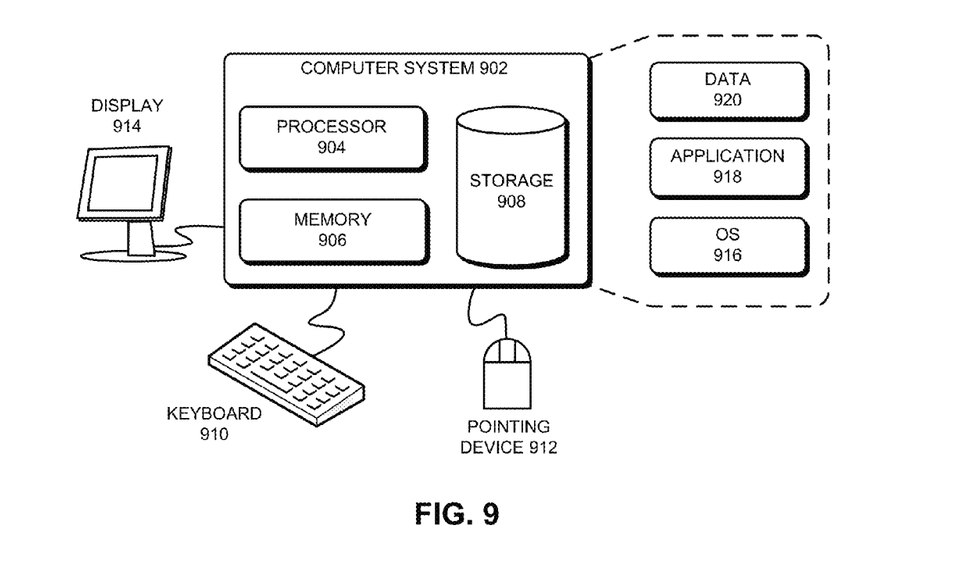
FIG. 9 illustrates a computer system in accordance with some embodiments described in this disclosure.

FIG. 9 illustrates a computer system in accordance with some embodiments described in this disclosure.

A computer system can generally include any device that is capable of performing computations. Specifically, a computer system, such as computer system 902, can include processor 904, memory 906, and storage device 908. Computer system 902 can be coupled to display device 914, keyboard 910, and pointing device 912. Storage device 908 can store operating system 916, application 918, and data 920. Data 920 can include any inputs required by application 918 or any outputs generated by application 918. Application 918 can include network management software.

Computer system 902 may automatically perform any method that is implicitly or explicitly described in this disclosure. Specifically, during operation, computer system 902 can load application 918 into memory 906. When application 918 is executed, it can perform one or more methods that are implicitly or explicitly described in this disclosure.

The data structures and code described in this disclosure can be partially or fully stored on a non-transitory computer-readable storage medium and/or a hardware mechanism and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data.

Embodiments described in this disclosure can be implemented in ASICs, FPGAs, dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes. Embodiments described in this disclosure may be implemented using purely optical technologies. The methods and processes described in this disclosure can be partially or fully embodied as code and/or data stored in a computer-readable storage medium or device, so that when a computer system reads and/or executes the code and/or data, the computer system performs the associated methods and processes.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A network, comprising:
a set of optical fiber rings, wherein each optical fiber ring carries data traffic on one or more wavelengths, and wherein each optical fiber ring is partitioned into multiple sectors; and
wherein each sector in the multiple sectors comprises:
a single add-wavelength-selectable-switch (add-WSS) to transmit data traffic to other sectors, wherein the single add-WSS is coupled via a passive optical coupler to a single optical fiber ring in the set of optical fiber rings, thereby combining an optical signal in the single optical fiber ring with an optical signal from the add-WSS, wherein the single add-WSS is coupled to an electro-optical switch (EOS), and wherein the EOS is coupled to an electrical switch; and a set of drop-wavelength-selectable switches (drop-WSSs) to receive data from other sectors, wherein each drop-WSSs in the set of drop-WSSs is coupled via a passive optical coupler to a corresponding optical fiber ring in the set of optical fiber rings, thereby splitting an optical signal in the corresponding optical fiber ring into two parts and providing one of the two parts to the drop-WSS, wherein each drop-WSS is coupled to a corresponding EOS in a set of electro-optical switches (EOSs), and the set of EOSs is coupled to a set of electrical switches.

2. The network of claim 1, wherein the set of electrical switches comprises a first layer of aggregation switches that is coupled to a second layer of edge switches.

3. The network of claim 2, wherein the edge switches are coupled to servers.

4. The network of claim 1, wherein the set of optical fiber rings comprises clockwise optical fiber rings and counter-clockwise optical fiber rings, wherein the set of optical fiber rings are configured to perform protection switching upon detecting a failure.

5. The network of claim 1, wherein packets are routed within the network based on a binary tree, wherein the binary tree includes a virtual root node, a set of dummy nodes, and a set of physical nodes, wherein each switch in the set of switches corresponds to a physical node in the binary tree.

6. The network of claim 1, wherein at least one sector includes one or more gateway switches that are coupled to an external network.

7. The network of claim 1, wherein the network is capable of being incrementally scaled by adding more sectors.

8. A datacenter, comprising:
a set of servers;
a network to enable communication between the set of servers, the network comprising:
a set of optical fiber rings, wherein each optical fiber ring carries data traffic on one or more wavelengths, and wherein each optical fiber ring is partitioned into multiple sectors; and
wherein each sector in the multiple sectors comprises:
a single add-wavelength-selectable-switch (add-WSS) to transmit data traffic to other sectors, wherein the single add-WSS is coupled via a passive optical coupler to a single optical fiber ring in the set of optical fiber rings, thereby combining an optical signal in the single optical fiber ring with an optical signal from the add-WSS, wherein the single add-WSS is coupled to an electro-optical switch (EOS), and wherein the EOS is coupled to an electrical switch; and
a set of drop-wavelength-selectable-switches (drop-WSSs) to receive data from other sectors, wherein each drop-WSSs in the set of drop-WSSs is coupled via a passive optical coupler to a corresponding optical fiber ring in the set of optical fiber rings, thereby splitting an optical signal in the corresponding optical fiber ring into two parts and providing one of the two parts to the drop-WSS, wherein each drop-WSS is coupled to a corresponding EOS in a set of electro-optical switches (EOSs), and the set of EOSs is coupled to a set of electrical switches.

9. The datacenter of claim 8, wherein the set of optical fiber rings comprises clockwise optical fiber rings and counter-clockwise optical fiber rings, wherein the set of optical fiber rings are configured to perform protection switching upon detecting a failure.

10. The datacenter of claim 8, wherein packets are routed within the network based on a binary tree, wherein the binary tree includes a virtual root node, a set of dummy nodes, and a set of physical nodes, wherein each switch in the set of switches corresponds to a physical node in the binary tree.

11. The datacenter of claim 8, wherein at least one sector includes one or more gateway switches that are coupled to an external network.

12. The datacenter of claim 8, wherein the network is capable of being incrementally scaled by adding more sectors.

13. An optical network that communicatively interconnects a set of servers, the optical network comprising:
a set of optical fiber rings, wherein each optical fiber ring carries data traffic on one or more wavelengths, wherein the set of optical fiber rings comprises clockwise optical fiber rings and counter-clockwise optical fiber rings, wherein the set of optical fiber rings are configured to perform protection switching upon detecting a failure, and wherein each optical fiber ring is partitioned into multiple sectors;
wherein each sector in the multiple sectors comprises:
a single add-wavelength-selectable-switch (add-WSS) to transmit data traffic to other sectors, wherein the single add-WSS is coupled via a passive optical coupler to a single optical fiber ring in the set of optical fiber rings, thereby combining an optical signal in the single optical fiber ring with an optical signal from the add-WSS, wherein the single add-WSS is coupled to an electro-optical switch (EOS), and wherein the EOS is coupled to an electrical switch; and
a set of drop-wavelength-selectable-switches (drop-WSSs) to receive data from other sectors, wherein each drop-WSSs in the set of drop-WSSs is coupled via a passive optical coupler to a corresponding optical fiber ring in the set of optical fiber rings, thereby splitting an optical signal in the corresponding optical fiber ring into two parts and providing one of the two parts to the drop-WSS, wherein each drop-WSS is coupled to a corresponding EOS in a set of electro-optical switches (EOSs), and the set of EOSs is coupled to a set of electrical switches; and
wherein packets are routed within the optical network based on a binary tree, wherein the binary tree includes a virtual root node, a set of dummy nodes, and a set of physical nodes, and wherein each electrical switch corresponds to a physical node in the binary tree.

14. The optical network of claim 13, wherein at least one sector includes one or more gateway switches that are coupled to an external network.

15. The optical network of claim 13, wherein the optical network is capable of being incrementally scaled by adding more sectors.

* * * * *